(12) United States Patent  (10) Patent No.: US 9,271,594 B1
Roth  (45) Date of Patent: Mar. 1, 2016

(54) APPARATUS AND METHOD FOR IMPROVED FOOD STEAMING

(71) Applicant: Kurt H Roth, Waterloo (CA)

(72) Inventor: Kurt H Roth, Waterloo (CA)

( * ) Notice: Subject to any disclaimer, the term of this patent is extended or adjusted under 35 U.S.C. 154(b) by 0 days.

(21) Appl. No.: 14/476,989

(22) Filed: Sep. 4, 2014

(51) Int. Cl.
*A47J 37/12* (2006.01)
*A47J 27/04* (2006.01)
*A23L 1/01* (2006.01)

(52) U.S. Cl.
CPC .............. *A47J 27/04* (2013.01); *A23L 1/0121* (2013.01); *A47J 37/1295* (2013.01); *A47J 2027/043* (2013.01)

(58) Field of Classification Search
CPC ...... A47G 19/14; A47J 31/20; A47J 37/1295; A47J 37/1219; A47J 37/0694; A47J 37/045; A47J 36/20; A47J 27/04; A47J 27/60
USPC ............... 99/317–320, 410–417; D7/322
See application file for complete search history.

(56) References Cited

U.S. PATENT DOCUMENTS

| | | | | | |
|---|---|---|---|---|---|
| 2,667,117 | A | * | 1/1954 | Millard et al. | 99/418 |
| 2,900,895 | A | * | 8/1959 | Schwaneke et al. | 99/284 |
| 3,143,059 | A | * | 8/1964 | Sofio | 99/440 |
| 4,138,939 | A | * | 2/1979 | Feld | 99/418 |
| 4,401,014 | A | * | 8/1983 | McGrail et al. | 99/283 |
| 4,953,452 | A | * | 9/1990 | Tarlow | 99/344 |
| 5,349,898 | A | * | 9/1994 | Po Wo Cheung | 99/417 |
| D473,751 | S | * | 4/2003 | Kaposi | D7/409 |
| 2006/0254431 | A1 | * | 11/2006 | Mariano et al. | 99/415 |

* cited by examiner

*Primary Examiner* — Dana Ross
*Assistant Examiner* — Hemant Mathew (57) ABSTRACT

Apparatus using a method of steam cooking food items in two consecutive steps whereby the food items contained in a food carrier are first preheated in water in a container which is being heated by a heater. After the food items are at or near the cooking temperature, the food carrier is raised above the water and into the steam zone produced by the boiling water for the purpose of steam cooking the food items. A cover is placed on the container so as to retain and concentrate the steam within the container to affect steam cooking of the food items.

3 Claims, 7 Drawing Sheets

APPARATUS AND METHOD FOR IMPROVED FOOD STEAMING

CROSS-REFERENCE TO RELATED APPLICATIONS

This application claims the benefit of U.S. Provisional Patent Application Ser. No. 61/211,828 filed Apr. 4, 2009 as well as the benefit of U.S. application Ser. No. 12/752,630 filed Apr. 1, 2010 and any U.S. Patent issuing thereon, both filed by the present inventor and entitled "IMPROVED FOOD STEAMING METHOD AND APPARATUS, their entire content hereby incorporated by reference for all purposes.

FIELD OF INVENTION

This invention relates to method and apparatus for steam cooking food.

BACKGROUND OF THE INVENTION

Steam cooking of food, particularly steam cooking of certain vegetables is a well known art. Commonly available devices for this purpose are generally known as "Vegetable Steamers". A simple "Vegetable Steamer" typically consists of a cooking container with a "Basket" that fits within the container closing its opening, and a cover that fits the opening of the basket. The basket has a perforated bottom and may also have a perforated sidewall. These perforations are small enough to prevent food particles from passing through. They are also sufficiently large and numerous to allow steam generated by water being boiled in the container to pass through the perforations and into the basket. To steam food, a quantity of water is placed into the cooking container, which is placed on a heater where the water is made to boil and produce steam. Food to be steamed is placed into the basket, the basket is placed into the container producing steam, and the cover is placed on the basket subjecting the food in the basket to continuous steam until it has attained a desirable edible state.

Many specific devices exist, all generally based on the common principle of steaming food/vegetable items from room temperature, or a frozen state, until they are deemed to be edible by the cook.

The method of steaming vegetables employed by state of the art "Steamers" can be characterized as a single step method. The basket containing the food initially at room temperature, or in a frozen state, is immersed in steam and held within this steam until the food items are deemed to be cooked adequately.

These conventional steamers suffer numerous problems and disadvantages, such as variable or unpredictable cooking times and uneven cooking. In view of these and other problems, while steaming food may be a nutritionally desirable process, steaming may not be used as readily as it might be if results were predictable, reliable and easily attained. Accordingly, the inventor has recognized a need for new or improved methods and apparatus for steaming food items.

SUMMARY

According to one aspect of the invention, there is a method of steam cooking. The method includes the steps of placing a food item in water; preheating the food item in the water, by heating the water, until the food item attains a preheated condition; boiling the water such that steam from boiling water contacts the food item; and cooking the food item in steam from the boiling water until the food item attains a cooked condition.

The preheated condition may be defined by commencement of the water boiling while the food item is in the water.

The water may be heated so as to boil the water prior to placing the food item in the water such that placing the food item in the boiling water temporarily stop the water from boiling. Accordingly the preheated condition may be defined by recommencement of boiling while the food item is in the water.

The preheated condition may correspond to the food item attaining a temperature approximately equal to the boiling point of water.

The steam may have a nominal steam temperature, and the cooked condition may be defined by cooking the food item for a predetermined time at the steam temperature.

According to another aspect of the invention, there is a method of steam cooking. The method includes the step of placing water in a first container, and placing a food item in a second container configured to retain the food item. The second container has perforated walls and is sized and shaped to be moveable within the first container between a lower position and an upper position. The method also includes the steps of placing the second container, and the food item therein, within the first container in the lower position such that the water passes through the perforated walls in the second container so as to contact the food item; and preheating the food item in the water, by heating the water, until the food item attains a preheated condition. After the food item attains the preheated condition, the method includes the steps of moving the second container to the upper position within the first container and above the water, boiling the water such that steam from boiling water passes through the perforated walls in the second container so as to contact the food item, and cooking the food item in the steam until the food item attains a cooked condition.

According to another aspect of the invention, there is a steaming apparatus. The apparatus includes a stand sized and shaped to fit into an opening of a first container configured to retain heated water. The stand has a base for being placed on a bottom surface of the first container. The apparatus also includes a second container configured to retain a food item. The second container has perforated walls and is sized and shaped to fit in the opening of the first container. The second container is moveable within the first container between a lower position such that the heated water within the first container passes through the perforated walls so as to heat a food item retained within the second contain, and an upper position such that the second container is located above the heated water within the first container and steam from the heated water passes through the perforated walls so as to heat the food item retained within the second container. The apparatus also includes a coupler for coupling the stand to the second container. The coupler is configured to allow the second container to move between the upper and lower position.

In some embodiments, the apparatus may also include a lifter coupled to the second container for raising and lowering the second container. Furthermore, the coupler may include a vertical member coupled to an edge of the stand so as to extend upward along a side of the second container, and a detent. The vertical member has at least one tooth. The detent is coupled to the second container for engaging the at least one tooth of the vertical member so as to retain the second container in a position corresponding to engagement of the detent and the at least one tooth. The lifter is configured to allow the detent to selectively engage and disengage the at least one tooth of the vertical member.

In some embodiments, the coupler may include a shaft coupled to a central portion of the stand and a bushing coupled to the second container and having a hollow end for slidably receiving the shaft. The shaft extends upward through an aperture in the second container and has at least one tooth. The bushing is received within the shaft through the aperture in the second container. The coupler may also include a detent coupled to the bushing for engaging the at least one tooth of the vertical member so as to retain the second container in a position corresponding to engagement of the detent and the at least one tooth, and a lifter coupled to the bushing for sliding the bushing along the shaft so as to raise and lower the second container between the upper and lower positions when the detent disengages the at least one tooth.

According to another aspect of the invention, there is an automatic steaming apparatus. The apparatus includes a first container configured to retain heated water and having a rim defining an opening, and a second container configured to retain a food item and having perforated walls. The second container is sized and shaped to fit in the opening of the first container and is moveable within the first container between a lower position such that the heated water within the first container passes through the perforated walls so as to heat a food item retained within the second container, and an upper position such that the second container is located above the heated water within the first container and steam from the heated water passes through the perforated walls so as to heat the food item retained within the second container. The apparatus also includes a lifter mechanism coupled to the first and second containers for automatically moving the second container from the lower position to the upper position after the heated water within the first container preheats the food item to a preheated condition.

The apparatus may include a temperature sensor in communication with the lifter mechanism. The temperature sensor is configured to measure the temperature of the water in the first container. Furthermore, the preheated condition corresponds to the temperature sensor measuring a temperature approximately equal to the boiling point of water.

According to another aspect of the invention, there is an automatic steaming apparatus. The apparatus includes a first container configured to retain heated water and having a rim defining an opening, and a second container configured to retain a food item and having perforated walls. The second container is sized and shaped to fit in the opening of the first container and is moveable within the first container between a lower position such that the heated water within the first container passes through the perforated walls so as to heat a food item retained within the second container, and an upper position such that the second container is located above the heated water within the first container and steam from the heated water passes through the perforated walls so as to heat the food item retained within the second container. The apparatus also includes a handle coupled to the second container for moving the second container between the lower position and the upper position. The handle includes a stepped portion configured to at least partially retain the second container in the upper position.

The handle may also include a hook for engaging the rim of the first container so as to at least partially retain the second container in the upper position.

Other aspects and features will become apparent, to those ordinarily skilled in the art, upon review of the following description of some exemplary embodiments.

DRAWINGS—FIGURES

The drawings included herewith are for illustrating various examples of methods and apparatus of the present specification and are not intended to limit the scope of what is taught in any way. In the drawings.

DETAILED DESCRIPTION

The inventor has recognized that conventional methods of steaming and steamers do not distinguish between two separate and functionally different stages in the overall steaming process. Before food can "cook" or "steam cook" the food temperature must rise to a cooking temperature which is generally at or near the temperature of steam, nominally 100° C. Before this temperature is reached, no or minimal cooking takes place.

This "preheating" stage is problematic in the overall steaming process since it is indeterminate and leads to difficulty in timing the completion of the overall process and leads to unpredictable and erratic results.

For example, it has been experimentally determined that green beans once they have reached the cooking temperature will steam cook quite consistently to a personal preference of taste and texture in nine (9) minutes. This cooking time tends to be repeatable with the same lot of green beans.

If these same green beans are steamed in a state of the art steamer from any other state than described above, the time required to achieve the same degree of taste and texture tends to be indeterminate and extremely variable.

Preheating time variability and unpredictability, which results in frequently unsatisfactory results achieved by state of the art steamers is inherent in the following.

The time required to heat food items from room temperature to the steam cooking temperature within the steamer is indeterminable and introduces a level of uncertainty in the overall time required to steam the food items adequately and uniformly.

If frozen foods are placed into a steamer directly, they need to thaw first before they can start to heat towards the cooking temperature. The time required to thaw these food items before they can heat towards steam cooking temperature introduces an additionally level of uncertainty in the overall time required to steam the food items adequately and uniformly.

Small food items tend to heat quickly to the cooking temperature and cook prematurely, whereas large food items tend to heat slower and cook variably. Steaming a mix of larger and smaller food items generally produces variability in both taste and texture of the large and small pieces.

A deep bed of food items tends to heat variably, where the lower and outer layers directly exposed to the steam generally heat first and start to cook, while upper and inferior food items tend to heat later and variably, depending on location and size of the food items.

Very large food items, such as whole mature carrots and potatoes, tend to be difficult to steam consistently because steam needs to condense on the outer surface of the vegetable before it can release its latent' heat to the surface of the vegetable for conduction to the interior of the vegetable, which tends to slow the preheating process because the layer of condensation needs to lose heat through thermal conductivity to the centre of the vegetable before more steam can condense. Accordingly, the exterior of the food item tends to reach a cooking temperature early and may start to cook while cooking of the interior of the food item is delayed. The ultimate result is that large food items tend to have overcooked exteriors with undercooked interiors.

Accordingly, the inventor has recognized a need for methods and apparatus of steam cooking food in two-stages, namely a first preheating stage and a second cooking stage.

Figure 1:
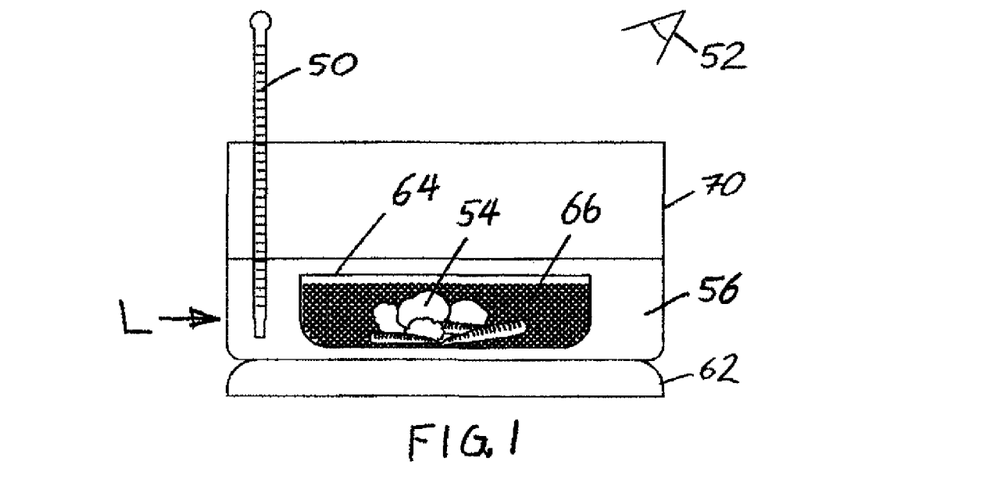
FIG. 1 is a schematic diagram that illustrates a first stage of a two stage steam cooking method according to an embodiment of the invention, wherein a food item is in a lower position and is immersed in water for preheating the food item, for example, to or near a food cooking temperature of 100° C.

A method of steam cooking food in two stages will now be described with reference to FIG. 1 and FIG. 2. Referring to FIG. 1, the method includes a first stage of preheating one or more food items 54 toward a cooking temperature while the food items 54 are submerged in water 56 that is being heated in a container 70 by a heat source 62. As shown, the food items 54 are in a lower position L of the container 70 during the first stage.

The termination of the first stage occurs when the food items 54 attain a preheated condition. For example, the preheated condition may be defined by the food items 54 attaining a predetermined temperature (e.g. approximately 100° C.) as measured by a thermometer 50 in the water 56, or by the commencement of the water 56 boiling, which may be visually determined by an observer 52.

Figure 2:
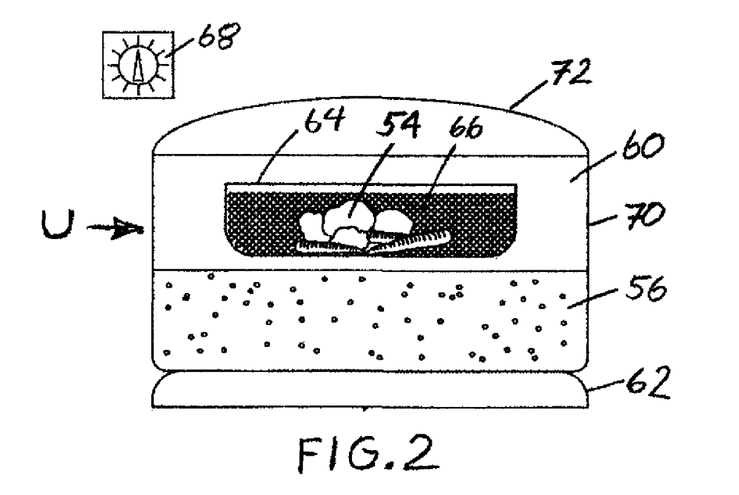
FIG. 2 is a schematic diagram that illustrates a second stage of the two stage steam cooking method of FIG. 1, wherein the preheated food item is in an upper position and is raised held in a steam zone for steam cooking the food item to a desired state of completion.

Referring to FIG. 2 the second stage begins after completing the first stage and includes steam cooking food items 54 in steam 60 until the food items attain a cooked condition. For example, the cooked condition may be determined by cooking the food items 54 for a predetermined time at the steam temperature.

As shown, the food items 54 are in an upper position U Of the container 70 during the second stage. The steam 60 may be retained within the container 70 using a cover 72.

Referring now to FIG. 1, illustrated therein is a container 70 and a food carrier 64 used for the first or preheating stage of the method. Food items 54 are retained in the food carrier 64, which is placed within container 70 in the lower position L. The food carrier 64 has openings or perforations 66 in its surface or walls, which allows water 56 to surround the food items 54. For example, the food carrier 64 may be a wire basket, a strainer, or another perforated container. The water 56 in the container 70 is heated by a heat source 62, which transfers heat to the food items 54 through the water 56. Accordingly, the food items 54 are progressively preheated in tandem with the rise in temperature of water 56. The first stage may end upon commencement of the water 56 boiling. For example, the thermometer 50 may indicate that the temperature of water 56 is approaching the boiling point, or alternately, the boiling point of water 56 can be observed visually by an observer 52 through noting the rapid boiling agitation of the surface of water 56.

Referring to FIG. 2, illustrated therein is the container 70 and the food carrier 64 being used for the second or cooking stage of the method. Food items, which are now preheated in the first stage (e.g. to or near the steam cooking temperature), are lifted out of the water 56 and into the upper position U above the surface of water 56, for example, by lifting the food carrier 64 to the upper position U. If the water 56 is not already boiling, the water is boiled to produce steam 60, which may be retained within the container 70 by cover 72. The steam 60 tends to surround the food items 54 in food carrier 64 by passing through the openings 66 and steam cooks the food items 54 until the food items attain a cooked condition. For example, the cooked condition may be determined by cooking the food items for a time period indicated by timer 68, which is set to signal completion of the second stage. The timer 68 may be set according to experience with the same or similar food items previously determined to have reached a desirable taste and texture in the set time period.

Referring now to FIGS. 3 to 10, various steam cooking apparatus will now be described, which may be used to implement the method described above.

Figure 3:
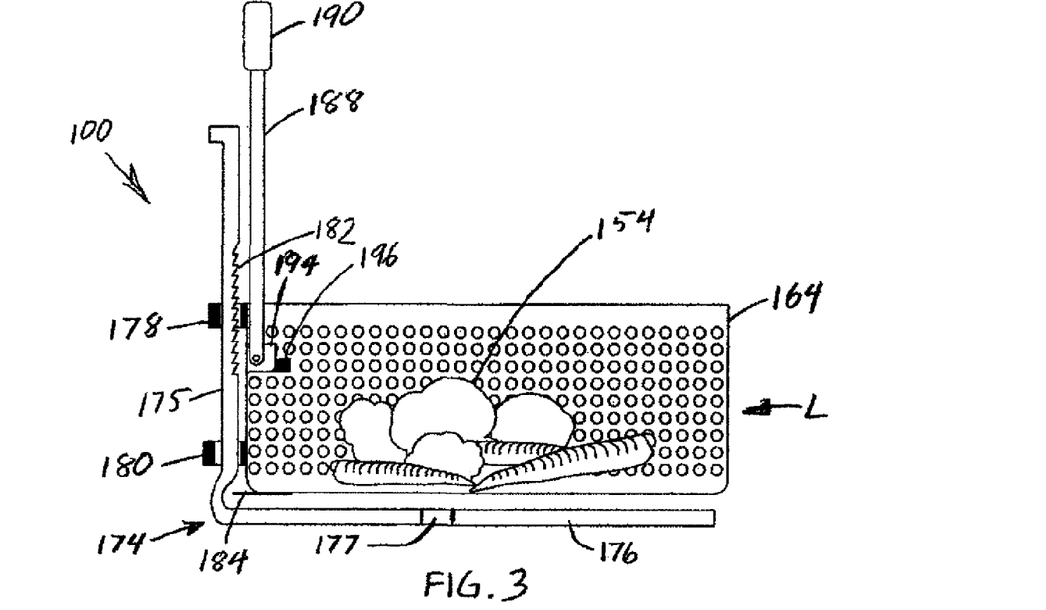
FIG. 3 is a sectional view of an apparatus for steam cooking a food item in two stages according to another embodiment of the invention, wherein the food item is in a lower position.
Figure 4:
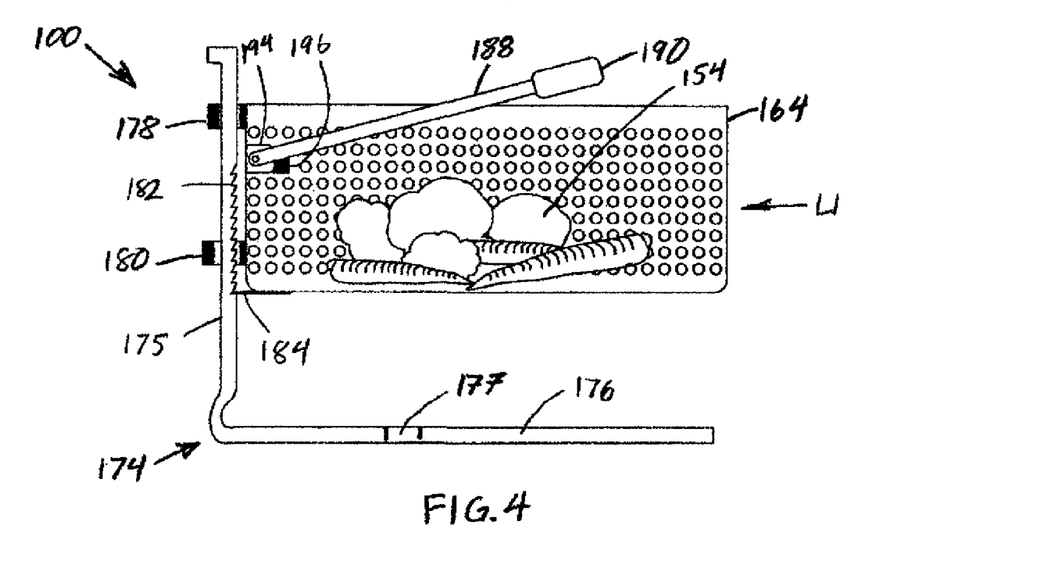
FIG. 4 is a sectional view of the apparatus of FIG. 3, wherein the food item is in an upper position.

Referring now to FIG. 3 and FIG. 4, illustrated therein is a steaming apparatus 100 comprising a food carrier 164 and a stand 174, which may be placed in a container, such as container 70. Food carrier 164 containing food items 154 is supported by stand 174. Furthermore, the stand 174 is configured to move the food carrier 164 between the lower position L in the first stage as shown in FIG. 3, and the upper position U in the second stage as shown in FIG. 4.

The apparatus 100 includes a coupler for coupling the food carrier 164 to the stand 174 and for allowing the food carrier 164 to move between the upper position U and the lower position L. In the illustrated embodiment, the coupler includes a vertical member 175 coupled to an edge of the stand 174 and a detent 184 coupled to the food carrier 164. The vertical member 175 has teeth 182 along a portion of its length. The detent 184 selectively engages one of the teeth so as to retain the food carrier 164 in a vertical position corresponding to the engage of the detent and the tooth. For example, the vertical position generally corresponds to the upper position U.

The apparatus 100 also includes upper guide 178 and lower guide 180, which are attached to the sidewall of food carrier 164. The upper and lower guides 178 and 180 slide along the vertical member 175 so as to guide the food carrier 164 along the vertical member 175 while moving it between the lower position L and the upper position U. For example, while the detent 184 engages one of the teeth 182, the lower guide 180 allows limited additional horizontal freedom of motion such that detent 184 may engage or disengage from teeth 184 and food carrier 164 may be moved to and held at multiple retaining locations along the length of the vertical member 175. The food carrier 164 is held by the force provided by the weight of food carrier 164 and the pivoting effect of upper guide 178, which provides loading to maintain firm contact between the detent 184 and teeth 182.

The stand 174 has a base, which may include a horizontal element 176 and cross element 177, which generally defines a cross-shape. The base provides a firm footing for the stand 174 so that it may be placed and maintain its horizontal orientation when placed into a container for steam cooking.

The apparatus 100 also includes a lifter coupled to the second container for raising and lowering the second container. In the illustrated embodiment, the lifter is a lifter arm 188 coupled to food carrier 164, for example, through an attachment 194 mounted to the sidewall of food carrier 164. The lifter arm 188 can be used to lift the food carrier 164 and simultaneously disengaging the holding action of detent 184 and teeth 182 such that food carrier 164 may be moved to and held at any available detent position along the length of the vertical member 175.

The lifter arm 188 may be pivotally coupled to the attachment 194, such that the lifter arm 188 may be moved between a generally vertical position and a generally horizontal position. In the vertical position, the lifter arm 188 can be used to move the food carrier 164 between the upper and lower positions. In the horizontal position, a lid can be placed on the container. A pivot stop 196 is coupled to the attachment 194 and limits the lowest pivotal position of lifter arm 188 when it is in the horizontal position.

The lifter arm 188 may include a grip 190 made of a suitable material to allow safe reduced temperature gripping of lifter arm 188.

Referring now to FIG. 3, the food carrier 164 is shown in the lower position L for preheating food items in the first stage. Lifter arm 188 is oriented vertically to allow access away from the boiling water when lifting the food carrier 164 from the lower position L to the upper position U.

Referring now to FIG. 4, the food carrier 164 is shown in the upper position U for steam cooking food items in the second stage. Lifter arm 188 is pivoted to its lower generally horizontal position as determined by the location of pivot stop 196 to reduce the overall height of the apparatus 100, which allows the cover 72 to be placed on the container 70.

Figure 5:
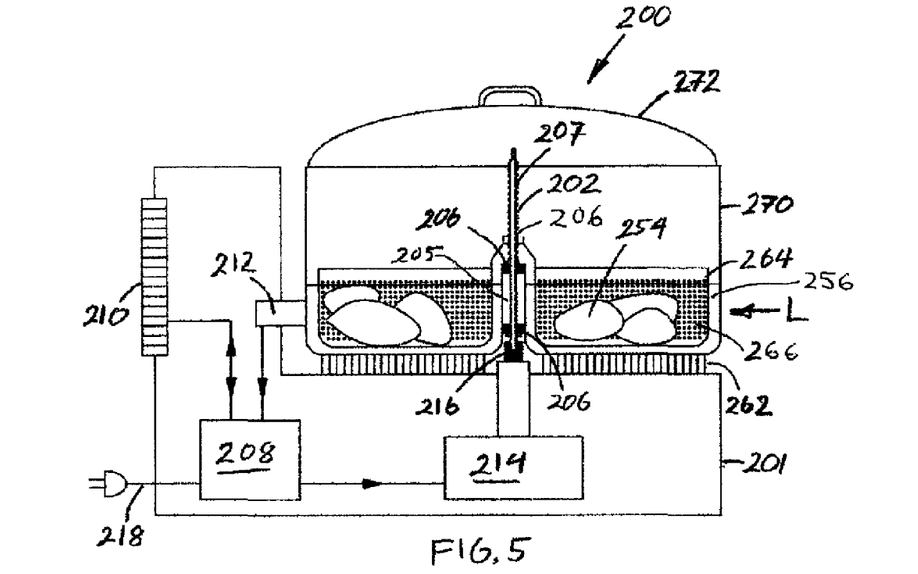
FIG. 5 is a sectional view of an automatic food steaming apparatus for steam cooking a food item in two stages according to another embodiment of the invention, wherein the food item is in a lower position.
Figure 6:
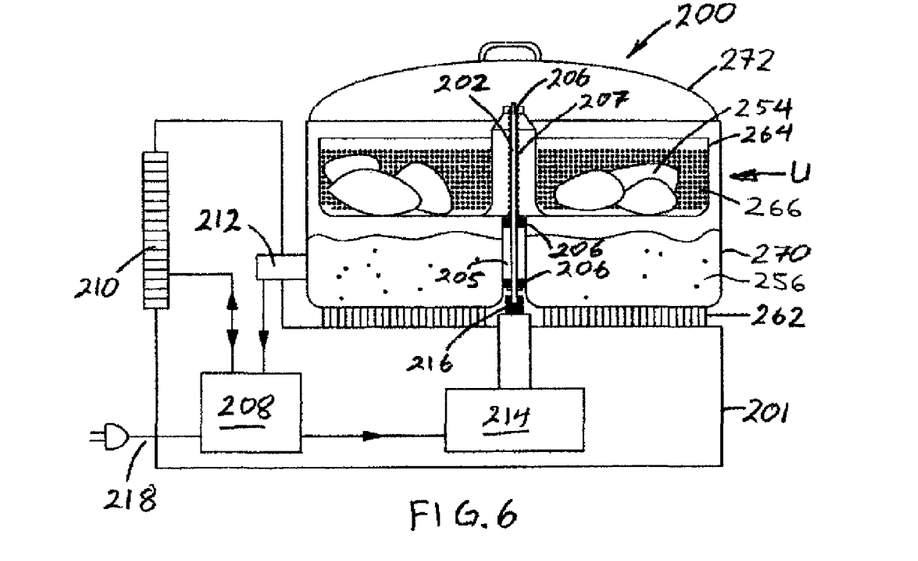
FIG. 6 is a sectional view of the automatic food steaming apparatus of FIG. 5, wherein the food item is in an upper position.

Referring now to FIG. 5 and FIG. 6, illustrated therein is an automatic food steaming apparatus 200 for automatically steam cooking food items in two stages according to another embodiment of the invention. In particular, the automatic food steaming apparatus 200 is shown as an electric appliance.

The electric appliance 200 includes a container 270 for retaining water and a food carrier 264 moveable between a lower position L and an upper position U within the container 270 as shown in FIG. 5 and FIG. 6 respectively. The electric appliance 200 also includes a lifter mechanism for automatically moving the food carrier 264 from the lower position to the upper position after the food item 254 attains the preheated condition as will be described below.

In the illustrated embodiment, the lifter mechanism is coupled to the container 270 at the centre of its bottom surface. The lifter mechanism includes a bushing 205 and a rotating shaft 207 with rotary seals 206 at both ends of the bushing 205 to prevent water penetration into bushing 205. The upper end of shaft 207 is threaded into screw 202 while the lower end is configured to provide a contact coupling 216 with the rotary drive provided by a motor 214, such as a gear motor.

The food carrier 264 is configured to fit within container 270 and is moveable within the container 270 between the lower position L and upper position U. For example, the centre of food carrier 264 has an internal screw thread for engaging the screw 202. Accordingly, rotation of shaft 207 clockwise or counter clockwise raises or lowers the food carrier 264 between the lower position L and the upper position U.

In some embodiments, the lifter mechanism may have different configurations. For example, the lifter mechanism may be a hydraulic or pneumatic cylinder, a spring operated by engaging or disengaging a latch, or any other suitable mechanism. Generally, the lifter mechanism is configured to automatically raise the food carrier 264 from the lower position to the upper position after the food item attains the preheated condition. The lifter mechanism may also be located in another position other than at the centre of food carrier 264, for example, external to water container 270 or within cover 272.

The electric appliance 200 also includes an appliance housing 201 that encloses a master controller 208 powered by electric power cord 218. The master controller 208 controls operation of the electric appliance 200, including the heater 262 and actuation of the lifter mechanism so as to move the food carrier between the lower and upper positions. For example, after filling the container 270 with water, the appliance 200 may be plugged in such that the master controller 208 turns on the heater 262. Then after, the food item attains the preheated condition, the master controller may actuate the lifter mechanism so as to automatically raise the food carrier 264 from the lower position L to the upper position U.

A temperature sensor 212 may be communication with the master controller 208 for determining when the food item attains the preheated condition. For example, the temperature sensor 212 measures the temperature of water 256 in container 270 that is being heated by heat source 262. In particular, the temperature sensor 212 is coupled to the wall of the container 270 for measuring the temperature of the water 256 through the wall. In other embodiments, the temperature sensor 212 may measure the temperature of the water directly.

When the temperature sensor 212 measures a temperature at or near the boiling point of the water, the master controller 208 actuates the lifter mechanism so as to raise the food carrier from the lower position L to the upper position U. For example, gear motor 214 receives power from master controller 208 according to input instructions received from the temperature sensor 212 and/or an internal control program.

The electric appliance 200 also includes a touch screen 210, which enables a user of the appliance 200 to determine the status of the cooking process and enables the user to input instructions to the master controller 208 for setting specific cooking conditions for the food item 254 being steam cooked. For example, the user may enter information that defines the preheated condition and/or the cooked condition. In particular, the user may input the amount of time that the food item will be cooked in the steam so as to define the cooked condition. Furthermore, the user may also input information to the master controller 208 through the touch screen 210 to activate a specific program provided by master controller 208, for example, "cook green beans", "cook potatoes", or "manual override" (e.g. to raise the food carrier 264 to the upper position manually).

Figure 7:
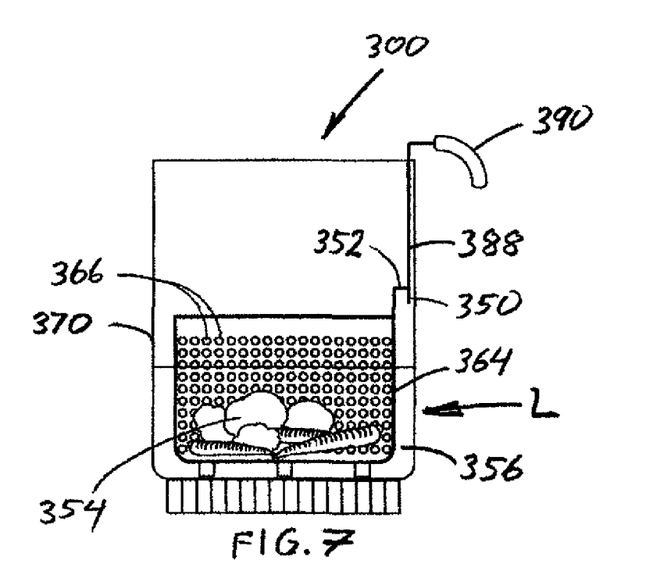
FIG. 7 is a sectional view of another food steaming apparatus for steam cooking a food item in two stages according to another embodiment of the invention, wherein the food item is in a lower position.
Figure 8:
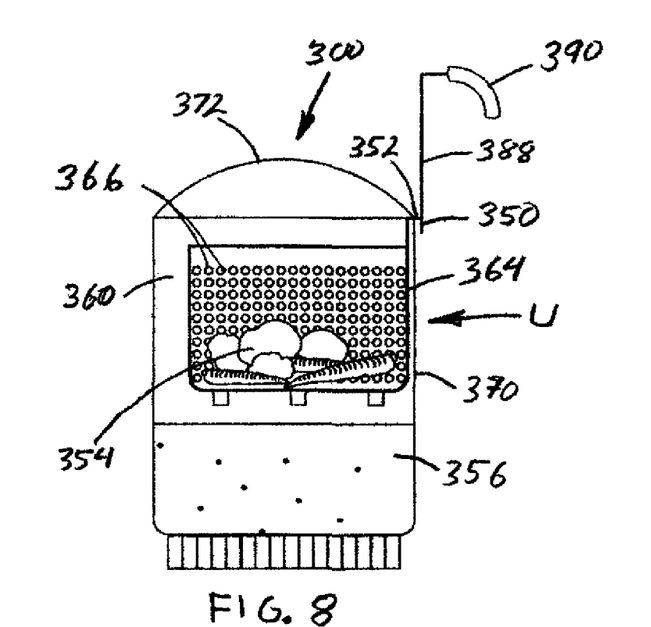
FIG. 8 is a sectional view of the food steaming apparatus of FIG. 7, wherein the food item is in an upper position.

Referring now to FIG. 7 and FIG. 8, illustrated therein is a steam cooking apparatus 300 comprising a container 370 for retaining heated water 356, a cover 372 for covering the container 370 and retaining steam 360 in the container 370 during the second stage, a food carrier or container 364 having openings 366 (e.g. a perforated container) for retaining food items 354, a lifter arm 388 (e.g. handle) coupled to food carrier 364, and a grip 390 on the lifter arm 388. Generally, the lifter arm 388 allows a user to move the food carrier 364 between a lower position L as shown in FIG. 7, and an upper position U as shown in FIG. 8. Accordingly, the food carrier 364 and the lifter arm 388 are generally sized and shaped to fit within the container 370 such that the food carrier 364 can be moved between the upper and lower positions.

Referring to FIG. 8, the lifter arm 388 has a stepped portion 352, which allows lifter arm 388 to pass through a gap between cover 372 and container 370 when the food carrier 364 is in the upper position and the cover 372 is on top of the container 370. The stepped portion 352 also at least partially retains the food carrier 364 in the upper position by engaging the rim of the container 370. In some embodiments, the lifter arm 380 may include a rim hook 350 on the stepped portion 352 for retaining the food basket 364 in the upper position U.

Figure 9:
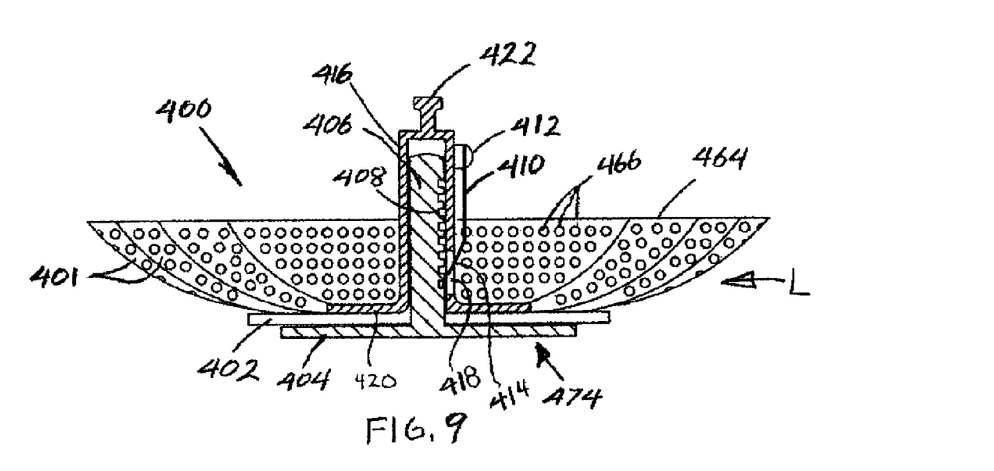
FIG. 9 is a sectional view of another food steaming apparatus for steam cooking a food item in two stages according to another embodiment of the invention, wherein the food item is in a lower position.
Figure 10:
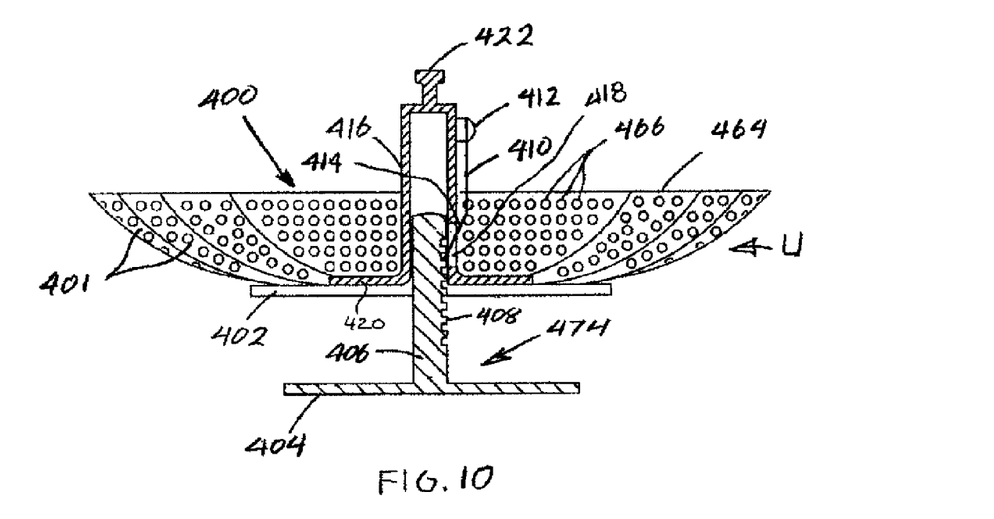
FIG. 10 is a sectional view of the food steaming apparatus of FIG. 9, wherein the food item is in an upper position.

Referring now to FIG. 9 and FIG. 10, illustrated therein is a steaming apparatus 400 comprising a food carrier 464 and a stand 474, which may be placed in any appropriate container with cover, such as containers 70 and 370, and lids 72 and 372. The stand 474 is configured to move the food carrier 464 between the lower position L in the first stage, and the upper position U in the second stage.

In the illustrated embodiment, the food carrier 464 is an adjustable sized container, which includes a plurality of overlapping leaves 401 pivotally coupled to a central hub portion 402. Pivoting or folding the leaves 401 upward about the central hub portion 402 causes adjacent leaves 401 to overlap more and decreases the diameter of the food carrier 464. Conversely, folding the leaves downward about the central hub portion 402 causes adjacent leaves 401 to overlap less and increases the diameter of the food carrier 464. Each leaf includes perforation or openings 466 to allow steam to pas through the openings 466 such that the steam contacts food items retained by the food carrier 464. In some embodiments, the food carrier 464 may have fixed, non movable legs on the bottom of the food carrier for providing a space between the food carrier 464 and the bottom of a container, such as containers 70 and 370.

The apparatus 400 includes a coupler for coupling the food carrier 464 to the stand 474 and for moving the food carrier between the lower position L and the upper position U. For example, the coupler includes a shaft 406 coupled to the stand 474 and having teeth 408, a bushing 416 coupled to the food carrier 464 that slidably receives the shaft 406, a detent coupled to the shaft 406 for engaging one of the teeth 408, and a lifter or grip 422 coupled to the bushing 416 for raising and lowering the food carrier 464.

The adjustable sized a flange 420 couples the bushing 416 to the central hub portion 402 of the food carrier 464. Bushing 416 has a lower end coupled to flange 420 and an upper end coupled to the grip 422. Stand 402 comprises a base 404 and a shaft 406 centrally attached to base 404. Shaft 406 slides freely in bushing 416.

In the illustrated embodiment, the detent 414 is coupled to the outer surface of the bushing 416. Accordingly, the side of the bushing 416 has an opening or slot 418 near its lower end to allow the detent 414 to pass through the bushing 416 and engage the teeth 408 on the shaft 406. In some embodiments, the detent may be coupled to different portions of the bushing 416, for example, the internal bore of the bushing.

Generally, the detent 414 is biased toward engagement with the teeth 408. For example, a leaf spring 410 having one end coupled to the bushing 416 and another end coupled to the detent 414. Leaf spring 410 provides spring loading to detent 414 which biases the detent 414 to engage or interlock with the teeth 408 and thereby support food carrier 464 above base 404 in a lower location L or an upper location U to allow the steam cooking of food items in two stages as described above. As shown in the illustrated embodiment, the detent 414 may be integrally formed with the leaf spring 410 and may be an extension of the leaf spring 410. In other embodiments, the detent 414 may be a separate piece.

In the illustrated embodiment, the teeth 408 are located on one side of the shaft 406, while the other side of the shaft is generally smooth, which may facilitate moving the food carrier 464 between the upper and lower positions. Accordingly, the bushing 416 may be rotated between an engaged position and a disengaged position. When the bushing 416 is rotated to the engaged position, detent 414 engages one of the teeth 408 so as to retain the food carrier 464 in a vertical position along the shaft 406. When the bushing 416 is rotated to the disengaged position, the detent 414 disengages the teeth 408 and is moveable along the smooth surface of the shaft 406 such that the bushing 416 can slide freely up and down the shaft 406 so as to raise and lower the food carrier 464. To again establish a support position, the bushing 416 can be rotated to the engaged position again such that the detent 414 engages or interlocks with one of the teeth 408.

Accordingly, the apparatus 400 can be used for the two stage steam cooking method described above. Furthermore, the apparatus 400 can be used in different containers having different sizes while still allowing the food carrier 464 to be moved between the upper and lower positions.

Figure 11:
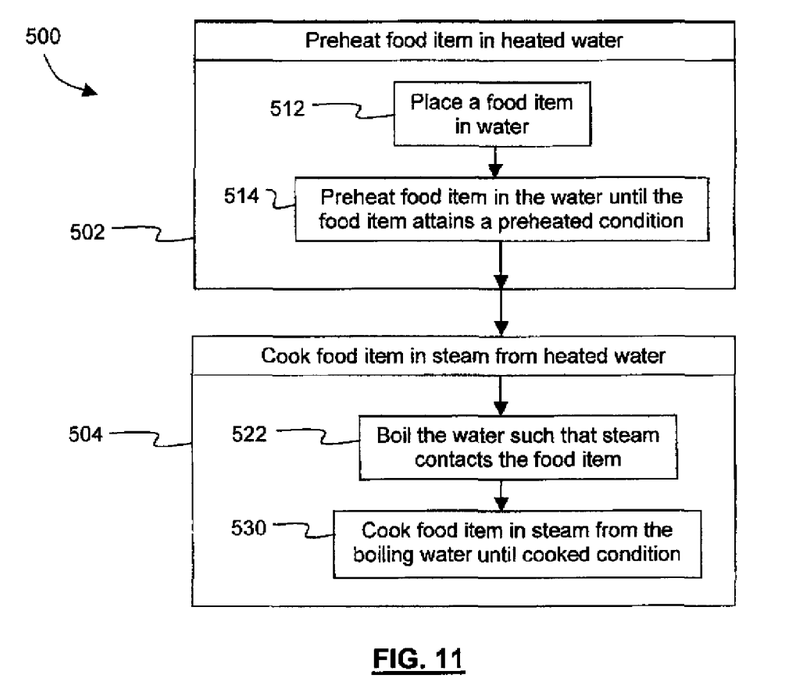
FIG. 11 is a flow chart illustrating a method of steaming a food item according to another embodiment of the invention.

Referring now to FIG. 11, illustrated therein is a method 500 of steam cooking according to an embodiment of the invention. The method 500 comprises a first stage 502 of preheating a food item in boiling or otherwise heated water, and a second stage 504 of cooking a food item in steam from boiling water.

The first and second stages 502, 504 may also include additional sub-steps. For example, in the illustrated embodiment, the first stage 502 includes steps 512 and 514, and the second stage 504 includes steps 522 and 530, as will be described below.

Step 512 includes placing a food item in water. For example, the food item may be placed in a food carrier, such as food carriers 64, 164, 264, 364, or 464 described previously, and the food carrier may be placed in a container filled with water, such as containers 70, 270, or 370 described previously.

In some embodiments, the food item may be placed in the water in different ways. For example, the food item may be placed in a basket, colander, or another perforated container. In some examples, the food item may be placed directly in the heated water, without a perforated container.

In some embodiments, the water is heated so as to boil the water prior to placing the food item in the water. Generally, placing the food item in the boiling water temporarily stops the water from boiling. For example, the water may stop boiling because the food item absorbs heat from the boiling water.

In some embodiments, the food item may be placed in water that is cold or otherwise not yet boiling.

Step 514 includes preheating the food item in the water, by heating the water, until the food item attains a preheated condition. Generally, the preheated condition is defined by commencement of the water boiling while the food item is in the water. For example, in some embodiments, the food item is placed in water that is already boiling, which temporarily stops the water from boiling. Then the water is reheated again to the boiling point and the preheated condition is defined by recommencement of boiling while the food item is in the water.

In some embodiments, such as when the food item is placed in water that is cold, or not yet boiling, the preheated condition may be defined by the initial commencement of the water boiling. Accordingly, the food item may be heated while contemporaneously brining the water to a boil.

In other embodiments, the preheated condition may be defined by different characteristics or events. For example, the preheated condition may correspond to the food item attaining a temperature approximately equal to the boiling point of water, or preheating the food item for a predetermined time.

After the food item reaches the preheated condition, the second stage 504 begins at step 522, which includes boiling the water such that steam from the boiling water cooks the food item. In some embodiments, the water may already be boiling, for example, when the preheated condition is defined by the commencement or recommencement of boiling.

Step 530 includes cooking the food item in steam from the boiling water until the food item attains a cooked condition. For example, the cooked condition may be defined by cooking the food item for a predetermined time at a predetermined temperature. Furthermore, the predetermined temperature may be the temperature of the steam or a nominal steam temperature. Generally, the steam temperature is approximately the boiling point of water, for example, about 100° C.

The predetermined time may depend on the food item being cooked. For example, some green beans tend to take approximately nine minutes to cook at a predetermined temperature of approximately 100° C.

Referring now to FIG. 10, illustrated therein is a method 600 of steam cooking according to another embodiment of the invention. The method 600 comprises a first stage 602 of preheating a food item in boiling or otherwise heated water, and a second stage 604 of cooking a food item in steam from the heated water. The first stage 602 includes steps 610, 612, 614, and 616, and the second stage 604 includes steps 620, 622 and 630 as will be described below.

Figure 12:
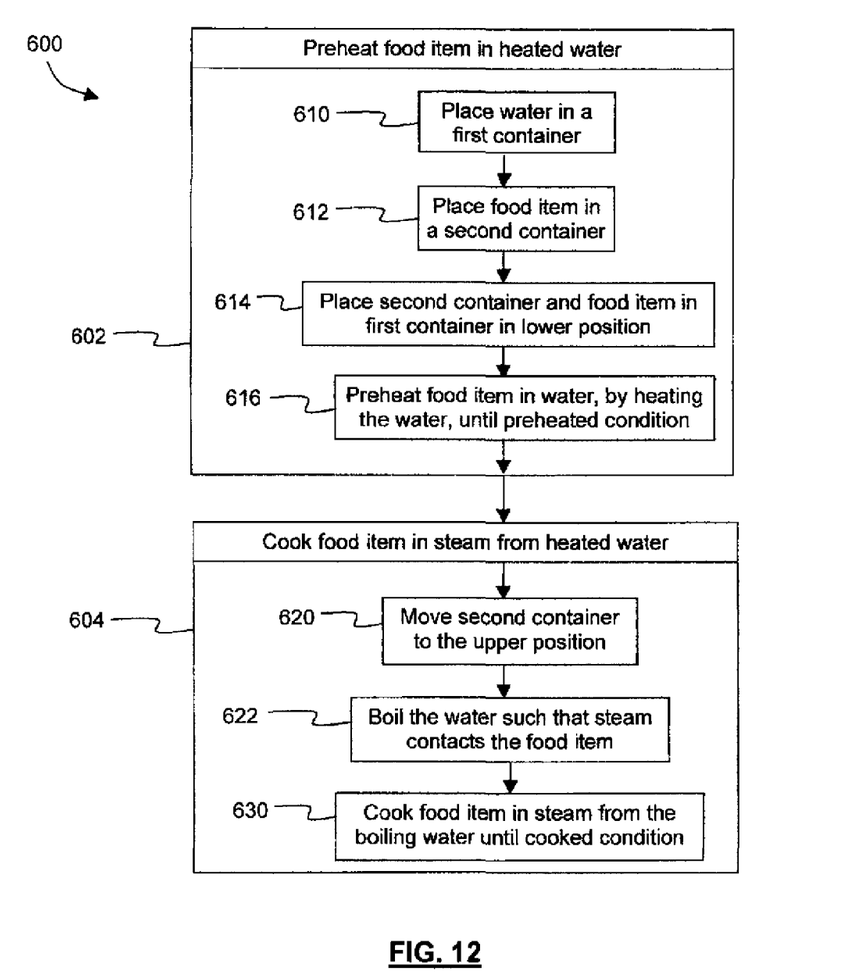
FIG. 12 is a flow chart illustrating another method of steaming a food item according to another embodiment of the invention.

Step 610 includes placing water in a first container. For example, the first container may be similar to the containers 70, 270, or 370 described previously.

Step 612 includes placing a food item in a second container configured to retain the food item. The second container has perforated walls and is sized and shaped to be moveable within the first container between a lower position and an upper position. For example, the second container may be similar to the food carriers 64, 164, 264, 364, or 464 described previously.

Step 614 includes placing the second container, and the food item therein, within the first container in the lower position such that the water passes through the perforated walls in the second container so as to contact the food item.

Step 616 includes preheating the food item in the water, by heating the water, until the food item attains a preheated condition. For example, the preheated condition may be defined by commencement of boiling while the second container is in the lower position such that the food item is in the water.

In some embodiments, the food item may be placed in water that is already boiling, which may temporarily stop the water from boiling, for example, because the food item absorbs heat from the boiling water. Then the water is reheated again to the boiling point and the preheated condition is defined by recommencement of boiling while the second container is in the lower position such that the food item is in the water.

In other embodiments, the preheated condition may be defined by different characteristics or events. For example, the preheated condition may correspond to the food item attaining a temperature approximately equal to the boiling point of water, or preheating the food item for a predetermined time.

After the food item attains the preheated condition, the second stage 604 begins at step 620, which includes moving the second container to the upper position within the first container and above the water. For example, the second container may be raised to the upper position using any of the lifting mechanisms or lifting arms described previously.

Step 622 includes boiling the water such that steam from the boiling water passes through the perforated walls in the second container so as to heat the food item. In some embodiments, the water may already be boiling, for example, when the preheated condition is defined by the commencement or recommencement of boiling.

Step 630 includes cooking the food item in the steam until the food item attains a cooked condition. For example, the cooked condition may be defined by cooking the food item for a predetermined time at a predetermined temperature. Furthermore, the predetermined temperature may be the temperature of the steam or a nominal steam temperature. Generally, the steam temperature is approximately the boiling point of water, for example, about 100° C.

Some of the embodiments described above provide one or more of the following advantages:

To allow more precise timing of the steaming time required to produce desired results by preheating food to be steamed and starting time count only when the food is in the steaming stage;

To thaw frozen food and vegetable pieces and raising their internal temperature uniformly to the cooking temperature before starting the steaming period;

To heat small and large pieces in a mixture of vegetables uniformly and evenly into the cooking temperature zone before starting the steaming process;

To reduce inconsistencies in the taste and texture of steamed food and vegetables;

To produce more uniformly steamed vegetable pieces in a mixture of larger and smaller pieces;

To reduce over-steaming of small pieces and under steaming of larger pieces in a mixture of vegetables;

To allow steam cooking of large whole vegetables such as potatoes, mature carrots, beets, yams, cabbage wedges and sweet potatoes; and To allow more consistent steaming of larger quantities of vegetables.

While the above description provides examples of one or more methods and/or apparatuses, it will be appreciated that other methods and/or apparatuses may be within the scope of the present description as interpreted by one of skill in the art.

I claim:

1. A steaming apparatus comprising:
   a stand means sized and shaped to fit into an opening of a first container configured to retain heated water, said stand means being positionable on a bottom surface of said first container;
   a second container coupled to said stand means and configured to retain at least one food item in an interior volume therein and having perforated walls defining a diameter of said interior volume, said second container being sized and shaped to fit in said opening of said first container and being movable relative to said stand means and securable to said stand means within said first container;

a lifting and holding means for moving said second container between:
- a lower position in which said heated water in said first container passes through said perforated walls of said second container to preheat said at least one food item retained within said second container;
- at least one upper position in which said second container is located above said heated water within said first container and steam from said heated water passes through said perforated walls to steam cook said at least one food item retained within said second container;

said second container comprising a central hub portion and said perforated walls of said second container comprising a plurality of overlappable leaves, each said leaf being pivotably coupled to said central hub portion, to adjust said interior volume of said second container;

said lifting and holding means comprising:
- a shaft coupled to said stand, said shaft having a plurality of teeth;
- a bushing coupled to said second container and slidably receiving said shaft in said bushing;
- a detent attached to said second container and biased to engagement with said teeth of said shaft to retain said second container in a selected vertical position between said lower position and said at least one upper position relative to said stand means, said bushing being movable relative to said shaft when said detent is disengaged from said teeth;
- said bushing has an opening for allowing said detent to engage said teeth of said shaft through said opening; and
- said detent comprises a spring extending between a first end of said spring coupled to said bushing, and a second end of said spring engageable with a selected one of said teeth to locate said second container in said selected vertical position.

2. The steaming apparatus of claim 1, wherein said bushing slidably and rotatably receives said shaft, for rotation of said detent between:
- an engaged position wherein said detent engages said selected one of said teeth; and
- a disengaged position wherein said detent disengages said selected one of said teeth and said bushing is slidable along said shaft for moving said second container relative to said base.

3. A steaming apparatus for cooking at least one food item inside a first container holding heated water, said steaming apparatus comprising:
- a second container receivable in said first container, said second container comprising a basket portion in which at least one food item is receivable;
- a shaft that is stationary relative to said first container;
- connecting means for connecting said second container to said shaft to locate said second container in a selected one of at least a lower position, in which said at least one food item in said basket portion is immersed in said heated water, and an upper position, in which said at least one food item in the basket portion is positioned above said heated water, to permit steam rising from said heated water to heat said at least one food item; and
- said connecting means being movable between engagement with said shaft, in which said second container is located in said selected one of said lower and said upper positions, and disengagement with the shaft, to permit movement of said second container relative to said shaft between said lower and said upper position and
- said second container being positionable in at least one intermediate position between said lower and upper positions and
- said shaft comprising a plurality of teeth substantially vertically aligned on said shaft; and
- said connecting means comprising a detent extending between fixed and free ends thereof, the fixed end being secured to said second container, and said free end being engageable between selected ones of said teeth to locate said second container in at least one of said upper and said lower positions and said at least one intermediate position and
- in which said second container comprises a bushing in which said shaft is receivable and
- in which at least one of said shaft and said bushing is rotatable relative to the other, for disengagement of said detent with said teeth to permit substantially vertical movement of said second container relative to said shaft, and for engagement of said detent with selected ones of said teeth to locate said second container in said at least one of said upper and said lower positions and said at least one intermediate position.

* * * * *